(12) United States Patent
Pannem et al.

(10) Patent No.: US 9,582,309 B2
(45) Date of Patent: Feb. 28, 2017

(54) ALLOCATING COST OF DISK USAGE TO A LINKED CLONE VIRTUAL MACHINE BASED ON A PARAMETER OF USAGE

(71) Applicant: VMware, Inc., Palo Alto, CA (US)

(72) Inventors: Hemanth Kumar Pannem, Palo Alto, CA (US); Akshay Prabhakar Mirajkar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 30 days.

(21) Appl. No.: 14/565,145

(22) Filed: Dec. 9, 2014

(65) Prior Publication Data

US 2016/0162315 A1    Jun. 9, 2016

(51) Int. Cl.
*G06F 9/46* (2006.01)
*G06F 9/455* (2006.01)

(52) U.S. Cl.
CPC ............ *G06F 9/45558* (2013.01); *G06F 2009/45562* (2013.01); *G06F 2009/45579* (2013.01); *G06F 2009/45583* (2013.01)

(58) Field of Classification Search
CPC ....... G06F 9/45558; G06F 2009/45579; G06F 2009/45583; G06F 2009/45562
See application file for complete search history.

(56) References Cited

U.S. PATENT DOCUMENTS

| | | | |
|---|---|---|---|
| 8,694,400 B1 * | 4/2014 | Certain | G06Q 30/00 705/26.3 |
| 2003/0092007 A1 | 5/2003 | Gibbs et al. | |
| 2005/0059041 A1 | 3/2005 | Johnson et al. | |
| 2007/0171921 A1 | 7/2007 | Wookey et al. | |
| 2007/0174410 A1 | 7/2007 | Croft et al. | |
| 2007/0174429 A1 | 7/2007 | Mazzaferri et al. | |
| 2007/0179955 A1 | 8/2007 | Croft et al. | |
| 2007/0180447 A1 | 8/2007 | Mazzaferri et al. | |
| 2007/0180448 A1 | 8/2007 | Low et al. | |
| 2007/0180449 A1 | 8/2007 | Croft et al. | |
| 2007/0180450 A1 | 8/2007 | Croft et al. | |
| 2007/0180493 A1 | 8/2007 | Croft et al. | |
| 2007/0186212 A1 | 8/2007 | Mazzaferri et al. | |
| 2007/0192329 A1 | 8/2007 | Croft et al. | |

(Continued)

OTHER PUBLICATIONS

Understanding Clones, VMware Workstation 5.0, https://www.vmware.com/support/ws5/doc/ws_clone_overview.html, 2 pages, accessed Dec. 9, 2014.
Cormac Hogan, Linked Clones Part 1—Fast Provisioning in vCloud Director 1.5, VMware vSphere Blog, http://blogs.vmware.com/vsphere/2011/11/linked-clones-part-1-fast-provisioning-in-vcloud-director-15.html, Nov. 16, 2011, 9 pages.

(Continued)

*Primary Examiner* — Camquy Truong

(57) ABSTRACT

The present disclosure is related to methods, systems, and machine-readable media for allocating cost of disk usage to a linked clone virtual machine (VM) based on a parameter of usage. A determination can be made as to a number of disks used by a linked clone VM among a plurality of disks in a software defined data center over a time period and as to a respective portion of a parameter of usage for each of the number of disks used by the linked clone VM over the time period that is attributable to the linked clone VM. A portion of a cost for usage of each of the number of disks over the time period can be allocated to the linked clone VM in proportion to the respective portion of the parameter of usage attributable to the linked clone VM and/or on a relative latency.

19 Claims, 6 Drawing Sheets

(56) References Cited

U.S. PATENT DOCUMENTS

| | | |
|---|---|---|
| 2007/0198656 A1 | 8/2007 | Mazzaferri et al. |
| 2009/0075841 A1 | 3/2009 | Johnson et al. |
| 2012/0245037 A1 | 9/2012 | Hogers et al. |
| 2012/0303923 A1 | 11/2012 | Behera et al. |
| 2012/0331462 A1 | 12/2012 | Falko |
| 2013/0196859 A1 | 8/2013 | Van Eijk et al. |
| 2013/0212161 A1 | 8/2013 | Ben-Shaul et al. |
| 2013/0212480 A1 | 8/2013 | Ben-Shaul et al. |
| 2013/0212579 A1 | 8/2013 | Ben-Shaul et al. |
| 2013/0219286 A1 | 8/2013 | Ben-Shaul et al. |
| 2013/0227558 A1 | 8/2013 | Du et al. |
| 2014/0047201 A1* | 2/2014 | Mehta ............... G06F 13/00 711/158 |
| 2014/0149347 A1 | 5/2014 | Ben-Shaul et al. |

OTHER PUBLICATIONS

Understanding Snapshots, VMware Workstation 5.0, https://www.vmware.com/support/ws5/doc/ws_preserve_sshot_understanding.html, 1 page, accessed Dec. 9, 2014.
Allow vSphere to Reclaim Disk Space in Linked-Clone Virtual Machines, VMware Horizon View 5.2 and 5.3 Documentation Center, http://pubs.vmware.com/view-52/index.jsp?topic=%2Fcom.vmware.view.administration.doc%2FGUID-F94492D8-AEC4-4AE4-A159-98EA216E2A28.html, 2 pages, accessed Dec. 9, 2014.
William Lam, Creating SE Sparse Linked Clones Using the vSphere 5.1 API, virtuallyGhetto, http://www.virtuallyghetto.com/2012/09/creating-se-sparse-linked-clones-using.html, Sep. 7, 2012, 6 pages.
Storage I/O Control, vSphere, http://www.vmware.com/products/vsphere/features-storage-io-control, 6 pages, accessed Dec. 9, 2014.

* cited by examiner

640

| Time | VM4 | VM1 | VM5 |
|---|---|---|---|
| t0 | 35 | 20 | 110 |
| t1 | 12 | 45 | 80 |
| t2 | 35 | 10 | 85 |
| t3 | 60 | 20 | 40 |
| t4 | 90 | 50 | 30 |
| t5 | 40 | 65 | 22 |

ALLOCATING COST OF DISK USAGE TO A LINKED CLONE VIRTUAL MACHINE BASED ON A PARAMETER OF USAGE

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual machines (VMs) have been introduced to lower data center capital investment in facilities and operational expenses and reduce energy consumption. A VM is a software implementation of a computer that executes application software analogously to a physical computer. VMs have the advantage of not being bound to physical resources, which allows VMs to be moved around and scaled to meet changing demands of an enterprise without affecting the use of the enterprise's applications.

In a software defined data center, storage resources may be allocated to VMs in various ways, such as through network attached storage (NAS), a storage area network (SAN) such as fiber channel and/or Internet small computer system interface (iSCSI), and/or raw device mappings, among others. VMs may run a finite set of operating systems along with some applications. Installing operating systems and applications may be time consuming. Accordingly, a virtualization technology called clones may be used to reduce the time in setup and to reuse already setup images.

DETAILED DESCRIPTION

Figure 1:
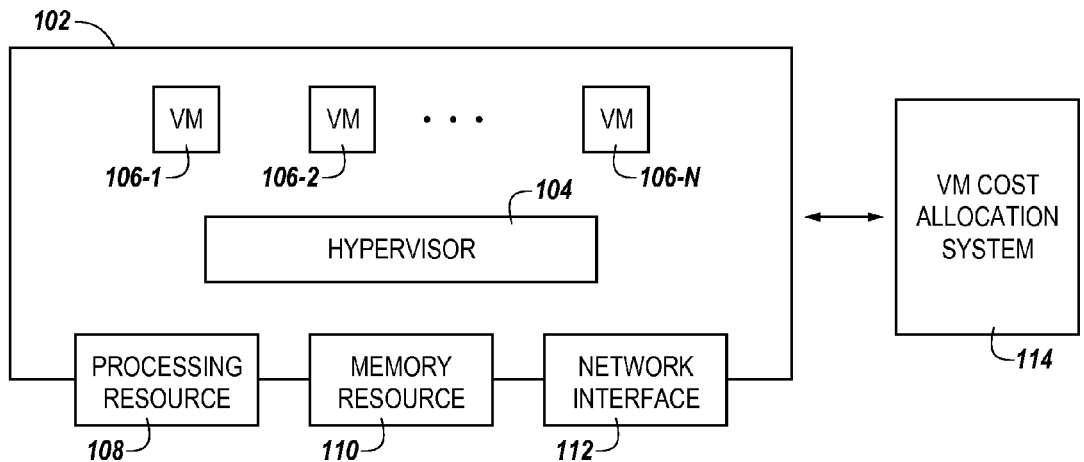
FIG. 1 is a diagram of a host and a system for allocating costs to linked clone virtual machines according to one or more embodiments of the present disclosure.

The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

While the specification refers generally to VMs, the examples given could be any type of data compute node, including physical hosts, VMs, non-VM containers, and hypervisor kernel network interface modules. Embodiments of the present disclosure can include combinations of different types of data compute nodes.

Examples of cloned VMs include full clones and linked clones. A full clone is an independent copy of a VM that shares nothing from the parent VM. Thus, for example, any changes to the parent VM made after the full clone is created will not be propagated to the full clone. A linked clone is a copy of a VM that shares disks with the parent VM. Thus, any changes made to the shared disks for the parent VM will be propagated to the linked clone VM. In some instances, linked clone VMs may share some, but not all disks. For example, a parent VM may have a shared disk with a linked clone VM and the parent VM may also have its own delta disk that is not shared with the linked clone VM so that changes for the parent VM can be made in the delta disk and not propagated to the linked clone VM while changes that are intended to affect both the parent VM and the linked clone VM can be made in the shared disk. As used herein with respect to VMs, a "disk" is a representation of memory resources (e.g., memory resources 110 illustrated in FIG. 1) that are used by a VM. As used herein, "memory resource" includes primary storage (e.g., cache memory, registers, and/or main memory such as random access memory (RAM)) and secondary or other storage (e.g., mass storage such as hard drives, solid state drives, removable media, etc., which may include non-volatile memory). The term "disk" does not imply a single physical memory device. Rather, "disk" implies a portion of memory resources that are being used by a VM, regardless of how many physical devices provide the memory resources. Because operating systems and general applications may take up most of the space on the VM disks, which can be duplicated across many VMs, linked clones can help to improve this situation. In addition to saving disk space, linked clones can also help in fast provisioning.

Linked clones can be created using the concept of VM snapshots. A VM snapshot can preserve the state of a VM so that it can be reverted to at a later point in time. The snapshot can include memory as well. In some embodiments, a snapshot includes secondary storage, while primary storage is optionally included with the snapshot. A linked clone VM can be constructed from a snapshot. A snapshot hierarchy and/or linked clone hierarchy can be represented as a tree of disks. The leaves of the tree can represent currently active delta disks. A delta disk can be a disk that stores changes from a parent disk (e.g., without storing an entire copy of the parent disk). Some embodiments of the present disclosure can accurately allocate storage costs for a VM that is using linked clones and/or snapshots (a "linked clone VM") using the linked clone hierarchy.

The tree of disks representing the linked clone hierarchy can become complex as the linked clone levels increase. At a given point in time, there could be multiple VMs sharing the same linked clone in multiple levels. This can complicate the costing of storage consumption per VM in a software defined data center at a given point in time. The complexity of the environment can multiply further when the cost of storage is to be allocated over a time period (e.g., where changes to the hierarchy may be made over the time period). In order to allocate costs to a VM accurately, a determination can be made as to the amount of resources consumed by the VM.

According to a number of embodiments of the present disclosure, costs can be allocated to a linked clone VM based on dynamic parameters. A dynamic parameter is a parameter that changes during runtime, whereas a static parameter is a parameter that does not usually change during runtime. Some examples of static parameters include a size of a disk being used, a number of VMs using the disk, and/or a clone count for the disk, among others. A parameter being static does not mean that the parameter is fixed or cannot change, as, for example, the number of VMs using a disk can change, and a use of the disk (a size of the disk) can change. Again, the term "disk" represents the memory resources used by a VM and is more indicative of an amount of memory used rather than an indication of one or more physical memory devices. However, such changes may occur outside of runtime, that is, outside of a time where operations are being performed on the disk by a VM. Some examples of dynamic parameters include a number of operations performed on a disk over time and/or a latency for operations performed on the disk. For example, a proportionate cost of the usage of a disk can be attributed to a linked clone VM that uses the disk based on operations performed on the disk by the linked clone VM and/or a proportionate cost of the usage of a disk can be attributed to a linked clone VM that uses the disk based on operations performed on the disk by the linked clone VM in consideration of the operational latency. Some advantages of using dynamic parameters can include higher accuracy than using static parameters because allocation can be based on actual runtime data about the a VM's disk usage. Some hypervisors support storage input/output (I/O) control such that performance can be controlled, balanced, and/or optimized across multiple hosts that host multiple VMs. For example, if two VMs (VM-1 and VM-2) are sharing a disk and the disk is accessed more by VM-1 than VM-2 over a time period, then more of the cost of the disk can be allocated to VM-1 than VM-2.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a host and a system for allocating costs to linked clone virtual machines according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual machines 106-1, 106-2, . . . , 106-N (referred to generally herein as "VMs 106"). The VMs can be provisioned with processing resources 108 and/or memory resources 110 and can communicate via the network interface 112. The processing resources 108 and the memory resources 110 provisioned to the VMs can be local and/or remote to the host 102. For example, in a software defined data center, the VMs 106 can be provisioned with resources that are generally available to the software defined data center and not tied to any particular hardware device. By way of example, the memory resources 110 can include volatile and/or non-volatile memory available to the VMs 106. The VMs 106 can be moved to different hosts (not specifically illustrated), such that a different hypervisor manages the VMs 106. The host 102 can be in communication with a VM cost allocation system 114. An example of the VM cost allocation system is illustrated and described in more detail with respect to FIG. 2. In some embodiments, the cost allocation system 114 can be a server, such as a web server.

Figure 2:
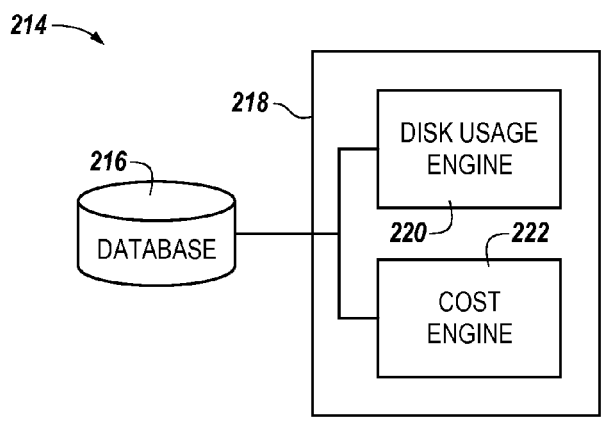
FIG. 2 is a diagram of a system for allocating costs to linked clone virtual machines according to one or more embodiments of the present disclosure.

FIG. 2 is a diagram of a system 214 for allocating costs to linked clone virtual machines according to one or more embodiments of the present disclosure. The system 214 can include a database 216, a subsystem 218, and/or a number of engines, for example disk usage engine 220 and/or cost engine 222, and can be in communication with the database 216 via a communication link. The system 214 can include additional or fewer engines than illustrated to perform the various functions described herein. The system can represent program instructions and/or hardware of a machine (e.g., machine 324 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

The disk usage engine 220 can include a combination of hardware and program instructions that is configured to determine, for a linked clone VM, a number of disks used by the linked clone VM among a plurality of disks in a software defined data center over a period of time. The disk usage engine 220 can be configured to determine a respective portion of a parameter of usage for each of the number of disks used by the linked clone VM over the time period that is attributable to the linked clone VM. In some embodiments, the disk usage engine 220 can be configured to poll a hypervisor of the linked clone VM to determine the portion of the parameter of usage (e.g., input/output operations (IOPs) that is attributable to the linked clone VM. The disk usage engine 220 can be configured to determine, for each of the plurality of disks in the software defined data center, a respective total plurality of IOPs over the time period. For example, the IOPs can be read IOPS.

In some embodiments, the disk usage engine 220 can be configured to build a linked clone tree for a number of VMs that use the plurality of disks in the software defined data center during the time period. Each node in the tree represents one of the plurality of disks in the software defined data center that is used by at least one of the number of VMs. Specifically, while disks can be physical or virtual, a node represents one virtual disk, which can be a portion of a physical disk, a whole physical disk, multiple physical disks, or combinations thereof. Examples of linked clone trees are illustrated and described in more detail with respect to FIGS. 4A-4D. The disk usage engine 220 can be configured, for a leaf in the tree corresponding to the linked clone VM, to determine a path from a root of the tree. The path can include a number of nodes representing the number of virtual disks used by the linked clone VM.

The cost engine 222 can include a combination of hardware and program instructions that is configured to allocate, to the linked clone VM, a portion of a cost for usage of each of the number of disks over the time period in proportion to the respective portion of the parameter of usage attributable to the linked clone VM. In some embodiments, the cost engine 222 can be configured to allocate the portion of the cost based on a unit rate per unit time. The unit rate per unit time can be common to two or more of the disks and/or specific to a particular disk. The size of a particular disk is an indication of how much memory the disk uses. In some embodiments, the cost engine 222 can be configured to allocate, to the linked clone VM, the portion of the cost regardless of relative latency of the linked clone VM to latency of other linked clone VMs that use the disks. In some embodiments, relative latency can be a factor in the allocation of costs as described in more detail herein.

Figure 3:
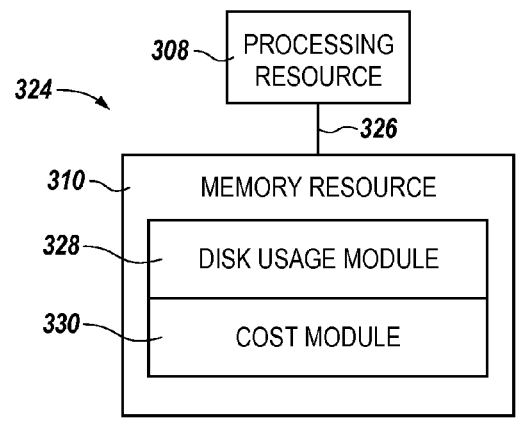
FIG. 3 is a diagram of a machine for allocating costs to linked clone virtual machines according to one or more embodiments of the present disclosure.

FIG. 3 is a diagram of a machine for allocating costs to linked clone virtual machines according to one or more embodiments of the present disclosure. The machine 324 can utilize software, hardware, firmware, and/or logic to perform a number of functions. The machine 324 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 324 (e.g., the machine 324 can include internal memory resources and have access to external memory resources). In some embodiments, the machine 324 can be a VM. The program instructions (e.g., machine-readable instructions (MRI)) can include instructions stored on the MRM to implement a particular function (e.g., an action such as performing seismic interference attenuation on an incoherent portion of separated seismic data). The set of MRI can be executable by one or more of the processing resources 308. The memory resources 310 can be coupled to the machine 324 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 326. The communication path 326 can be local or remote to the machine 324. Examples of a local communication path 326 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 326 can be such that the memory resources 310 are remote from the processing resources 308, such as in a network connection between the memory resources 310 and the processing resources 308. That is, the communication path 326 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules 328, 330 that when executed by the processing resources 308 can perform a number of functions. As used herein a module includes a set of instructions included to perform a particular task or action. The number of modules 328, 330 can be sub-modules of other modules. For example, the cost module 330 can be a sub-module of the disk usage module 328 and/or can be contained within a single module. Furthermore, the number of modules 328, 330 can comprise individual modules separate and distinct from one another. Examples are not limited to the specific modules 328, 330 illustrated in FIG. 3.

Each of the number of modules 328, 330 can include program instructions and/or a combination of hardware and program instructions that, when executed by a processing resource 308, can function as a corresponding engine as described with respect to FIG. 2. For example, the disk usage module 328 can include program instructions and/or a combination of hardware and program instructions that, when executed by a processing resource 308, can function as the disk usage engine 220 and/or the cost module 330 can include program instructions and/or a combination of hardware and program instructions that, when executed by a processing resource 308, can function as the cost engine 222.

The machine 324 can include a disk usage module 328, which can include instructions to determine, for each of a number of disks used by a linked clone VM, among a plurality of disks in a software defined data center, a relative usage attributable to the linked clone VM over a time period in consideration of a relative latency for the linked clone VM over the time period versus other linked clone VMs that use the number of disks. The instructions to determine the relative usage in consideration of the relative latency can include instructions to determine a latency factor for the linked clone VM. A latency factor is described in more detail with respect to FIG. 7. The latency factor can be based on a latency for the linked clone VM, and average latency for the linked clone VM and the other linked clone VMs, and a weight of latency on cost. The latency for the linked clone VM and/or the average latency for the linked clone VM and the other linked clone VMs can be measured during runtime. The weight of the latency on cost can be received as an input.

In some embodiments, the disk usage module 328 can include instructions to determine the disks used by the linked cone VM over the time period. For example, such instructions can include instructions to determine a path from a root of a linked clone tree for the linked clone VM. The linked clone tree, as described herein, can represent linked clone VMs that use the disks during the time period. Each node in the tree can represent one virtual disk and the path can include nodes representing the virtual disks used by the linked clone VM.

The machine 324 can include a cost module 330, which can include instructions to allocate, to the linked clone VM, a cost for usage of each of the number of disks over the time period based on the relative usage and relative latency. The disk usage module 328 can include instructions to determine the relative usage and the relative latency with instructions to determine a first value that is a number of IOPs attributable to the linked clone VM over a time period in consideration of a latency factor for the linked clone VM over the time period. The disk usage module 328 can further include instructions to determine a second value that is a sum of a number of IOPs attributable to each other linked clone VM that uses the number of disks over the time period in consideration of a latency factor for each other linked clone VM. In some embodiments, the cost module 330 can include instructions to allocate, to the linked clone VM, the cost for the usage of each of the number of disks over the time period in proportion to a ratio of the first value to the second value.

Figure 4A:
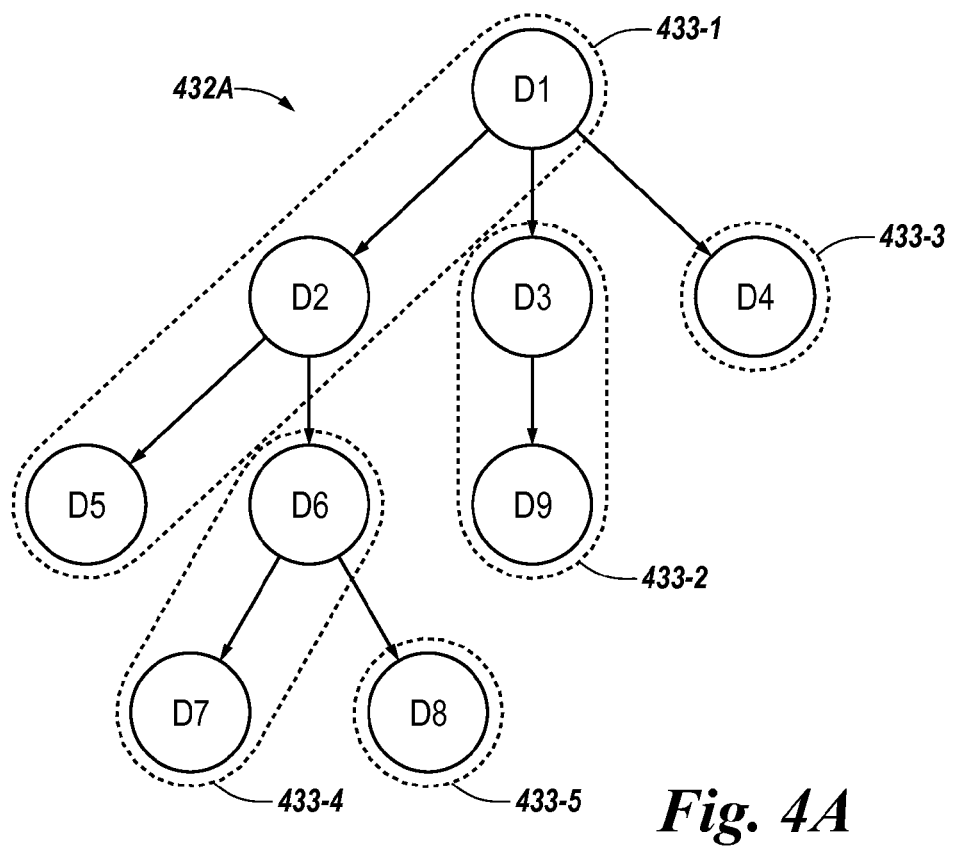
FIG. 4A illustrates a linked clone hierarchy at a first time according to one or more embodiments of the present disclosure.

FIG. 4A illustrates a linked clone hierarchy 432A at a first time according to one or more embodiments of the present disclosure. The linked clone hierarchy 432A represents an example including five VMs (VM1, VM2, VM3, VM4, VM5) to help explain a number of embodiments of the present disclosure. At the outset, VM1 has disk D1. As used herein with respect to VMs, a "disk" is a representation of memory resources (e.g., memory resources 110 illustrated in FIG. 1) that are used by the VM. A snapshot can be taken on VM1, which locked disk D1, to create a delta disk D2. As described herein, delta disk D2 can be used to store changes from disk D1, in this example, for VM1. Locking a disk, as used herein, indicates that no further changes to the disk will be made. In this example, VM1 can lock disk D1 when delta disk D2 is created (e.g., so that any further changes for VM1 can be stored on delta disk D2).

From the snapshot of VM1, two linked clone VMs (VM2 and VM3) can be created with delta disks D3 (VM2) and D4 (VM3) respectively. Thus, the linked clone VMs (VM2 and VM3) are linked clones of VM1 in its state as recorded on disk D1. This is illustrated in the linked clone hierarchy by the lines connecting disk D1 to disks D3 and D4 respectively. Thus, any changes to VM1 made after disk D1 was locked and delta disk D2 was created would not be reflected in the linked clones VM2 and VM3 because such changes would be stored in delta disk D2 and the linked clones VM2 and VM3 were snapshots of VM1 according to disk D1 rather than delta disk D2.

An application can be installed in VM1 in delta disk D2. This is a change to VM1 (e.g., installing a new application). As described above, such a change to VM1 would not reach the linked clones VM2 and VM3 because they were cloned from VM1 in its state recorded in disk D1. After the application is installed, a snapshot can be taken on VM1, which locked disk D2 (where the application was installed) and created a new delta disk D5 (e.g., where any further changes for VM1 can be stored).

From the snapshot of VM1 at disk D2, a linked clone (VM4) can be created with delta disk D6. VM4 can write some data into delta disk D6. Subsequently, a snapshot can be taken on VM4, which can lock delta disk D6 to create delta disk D7. Thus, any further changes for VM4 can be reflected in delta disk D7. A linked clone VM (VM5) can be created from VM4 at disk D6 with delta disk D8 for VM5. A VM can make changes to its disk at any time and may not lock the disk unless a snapshot is going to be taken, for example, to preserve a particular state of the VM and/or to create a linked clone VM. The snapshot allows the VM to have a new delta disk for further changes and allows the new linked clone VM to have its own delta disk based on the previous state of the VM from which it was cloned. Thus, for example, a snapshot can be taken on VM2, which can lock disk D3, and create delta disk D9.

In the linked clone hierarchy 432A illustrated in FIG. 4A, various states of VM1 are represented by disks D1, D2, and D5 as illustrated by dotted line 433-1. Various states of VM 2 are represented by disks D3 and D9 as illustrated by dotted line 433-2. A state of VM3 is represented by disk D4 as illustrated by dotted line 433-3. Various states of VM4 are represented by disks D6 and D7 as illustrated by dotted line 433-4. A state of VM5 is represented by disk D8 as illustrated by dotted line 433-5.

The linked clone hierarchy 432A is presented as a linked clone tree. Each virtual disk is presented as a node. A node is a parent node if it has a child node. A child node is a node that depends from a parent node as represented by a line coming from a first node with an arrow toward a second node. Child nodes are generally presented below parent nodes. A parent node that has no parent node of its own is a root node (e.g., disk D1). A child node with no child node of its own is a leaf node (e.g., disks D5, D7, D8, D9, and D4). A leaf node in the linked clone tree represents a current state of a particular VM. Thus, for example, leaf node disk D5 represents a current state of VM1, leaf node disk D7 represents a current state of VM 4, leaf node disk D8 represents a current state of VM5, leaf node disk D9 represents a current state of VM2, and leaf node disk D4 represents a current state of VM3. The linked clone tree illustrated in FIG. 4A represents the linked clone hierarchy 432A at a first time (t1).

Each VM can also have a diskchain, which is a path from the root node to that VM's leaf node, representing its current state. A diskchain for VM1 is D1-D2-D5. A diskchain for VM2 is D1-D3-D9. A diskchain for VMS is D1-D2-D6-D8. A diskchain for VM4 is D1-D2-D6-D7. A diskchain for VM3 is D1-D4. An example of executable instructions to determine a diskchain for VM4 is: Path(root,VM4). The diskchains for each VM over a particular time period can be superimposed to create a linked clone hierarchy, such as linked clone hierarchy 432A.

Figure 4B:
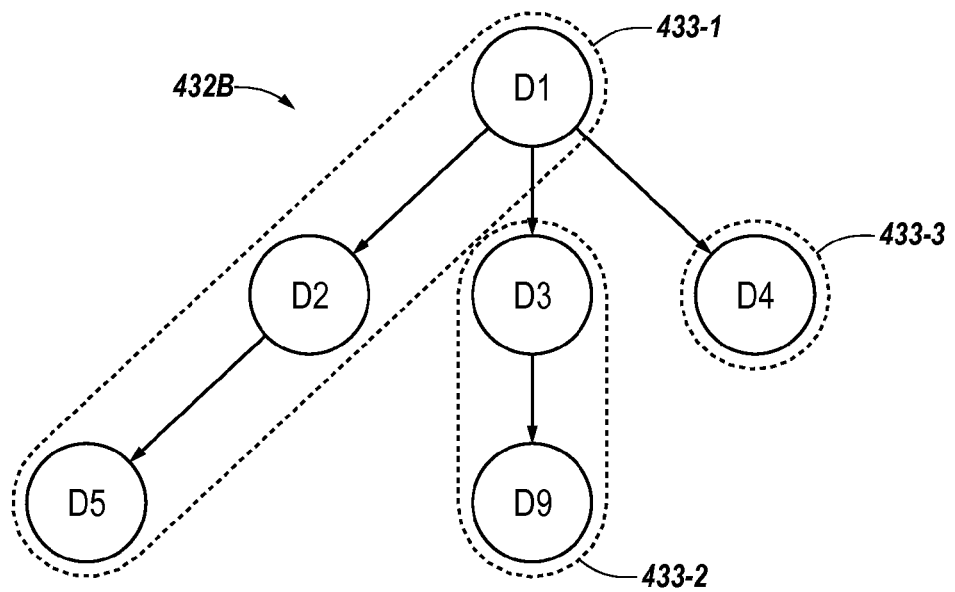
FIG. 4B illustrates the linked clone hierarchy of FIG. 4A at a second time according to one or more embodiments of the present disclosure.

FIG. 4B illustrates the linked clone hierarchy of FIG. 4A at a second time (t2) according to one or more embodiments of the present disclosure. The linked clone hierarchy 432B illustrated in FIG. 4B reflects changes to the linked clone hierarchy 432A illustrated in FIG. 4A where VM4 and VM5 have been deleted (the dependent linked clones can be deleted—linked clone disk D8 can be deleted and hence VM5 got deleted and afterwards VM4 is deleted, which removed disks D6 and D7). Thus, disks D6, D7, and D8 have been removed from the linked clone tree because various states of VM4 were represented by disks D6 and D7 as illustrated by dotted line 433-4 and a state of VM5 was represented by disk D8 as illustrated by dotted line 433-5 and because no other VMs were linked clones of VM4 and VM5.

In the linked clone hierarchy 432B illustrated in FIG. 4B, various states of VM1 are represented by disks D1, D2, and D5 as illustrated by dotted line 433-1. Various states of VM 2 are represented by disks D3 and D9 as illustrated by dotted line 433-2. A state of VM3 is represented by disk D4 as illustrated by dotted line 433-5. Leaf node disk D5 represents a current state of VM1, leaf node disk D9 represents a current state of VM 2, and leaf node disk D4 represents a current state of VM3.

Figure 4C:
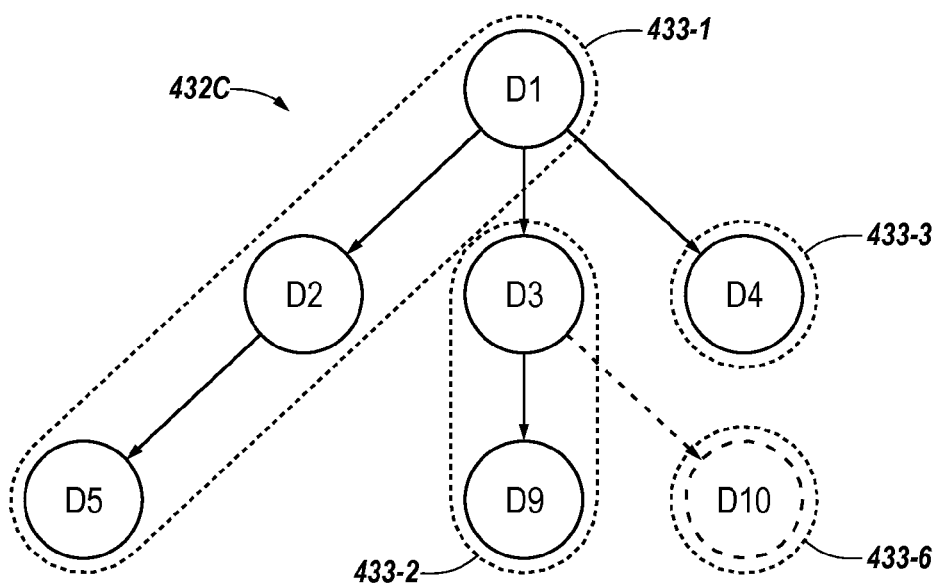
FIG. 4C illustrates the linked clone hierarchy of FIG. 4A at a third time according to one or more embodiments of the present disclosure.

FIG. 4C illustrates the linked clone hierarchy of FIG. 4A at a third time (t3) according to one or more embodiments of the present disclosure. The linked clone hierarchy 432C illustrated in FIG. 4C reflects changes to the linked clone hierarchy 432B illustrated in FIG. 4B where a linked clone created on VM2 in its state represented in disk D3, which was already locked when delta disk D9 was created, to create a delta disk D10 for a new VM (VM6). The dashed lines indicate elements that were added during time t3 (e.g., disk D10 was added).

In the linked clone hierarchy 432C illustrated in FIG. 4C, various states of VM1 are represented by disks D1, D2, and D5 as illustrated by dotted line 433-1. Various states of VM2 are represented by disks D3 and D9 as illustrated by dotted line 433-2. A state of VM3 is represented by disk D4 as illustrated by dotted line 433-3. A state of VM6 is represented by disk D10 as illustrated by dotted line 433-6. Leaf node disk D5 represents a current state of VM1, leaf node disk D9 represents a current state of VM 2, leaf node disk D4 represents a current state of VM3, and leaf node disk D10 represents a current state of VM6.

Figure 4D:
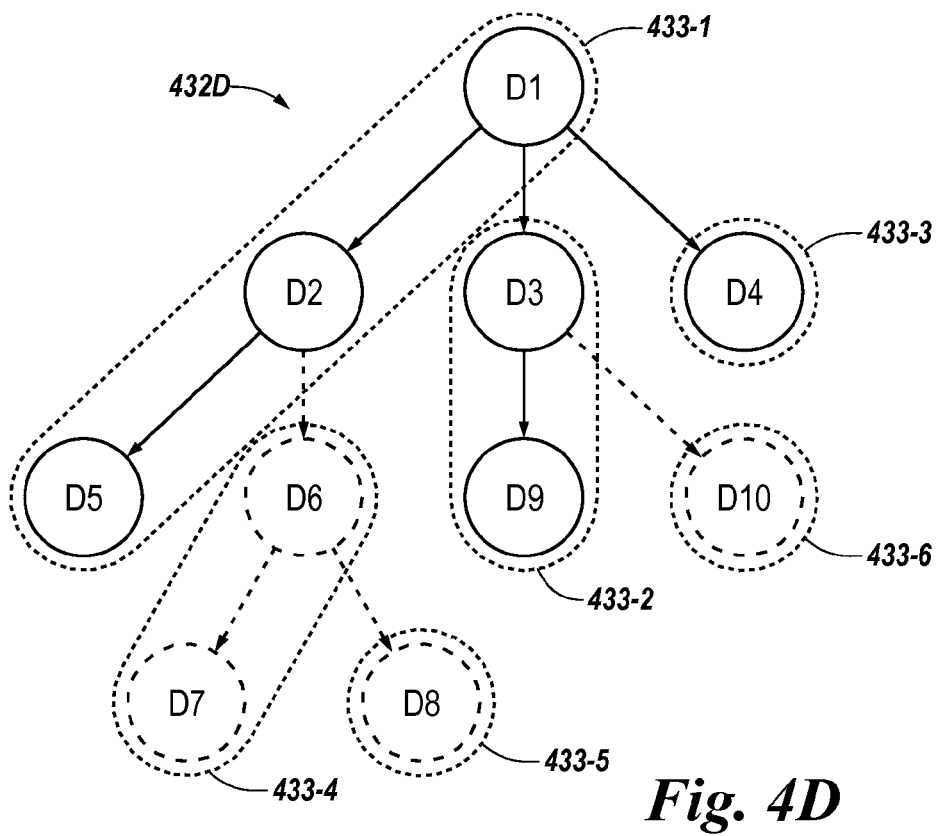
FIG. 4D illustrates the linked clone hierarchy of FIG. 4A at a fourth time according to one or more embodiments of the present disclosure.

FIG. 4D illustrates a superimposed linked clone hierarchy representing the linked clone hierarchy of FIGS. 4A-4C over the time period from the first time to the third time (over t1, t2, t3) according to one or more embodiments of the present disclosure. The linked clone hierarchy 432D illustrated in FIG. 4D includes all of the VMs (VM1, VM2, VM3, VM4, VM5, VM6) and all of the disks (D1, D2, D3, D4, D5, D6, D7, D8, D9, D10) that existed over the time period (t1-t3). It is a superimposition of the linked clone hierarchy 432A illustrated in FIG. 4A with the linked clone hierarchy 432B illustrated in FIG. 4B and the linked clone hierarchy 432C illustrated in FIG. 4C. Such a superimposition can be beneficial for allocating costs to linked clone VMs according to a number of embodiments of the present disclosure. The dashed lines indicate elements that are different between times t1, t2, and t3 (e.g., D6, D7, and D8 were removed and D10 was added).

In the linked clone hierarchy 432D illustrated in FIG. 4D, various states of VM1 are represented by disks D1, D2, and D5 as illustrated by dotted line 433-1. Various states of VM 2 are represented by disks D3 and D9 as illustrated by dotted line 433-2. A state of VM3 is represented by disk D4 as illustrated by dotted line 433-3. Various states of VM4 are represented by disks D6 and D7 as illustrated by dotted line 433-4. A state of VM5 is represented by disk D8 as illustrated by dotted line 433-5. A state of VM6 is represented by disk D10 as illustrated by dotted line 433-6.

An example of executable instructions to provide diskchains, which can be used in creating a linked clone hierarchy, is:

```
//The algorithm returns list of diskchains.
//Each diskchain is a list of disks.
Diskchains getDiskChainsBetween(Time t1, Time t2):
    vms = getAllVMs(t1,t2)
    List<LinkedList<Disk>>diskChains = empty list
    for each vm in vms:
        List<VMDisk> vmDisks = vm.getVMDisks(t1,t2)
        for each vmDisk in vmDisks:
            LinkedList<Disk>diskChain = vmDisk.
            getDiskLayout(t1,t2)
            diskChains.add(diskChain)
    return diskchains
```

As will be appreciated, the times (e.g., t1, t2) can be adjusted to provide diskchains over different time periods.

An example of executable instructions to provide a linked clone hierarchy, such as is illustrated in FIGS. 4A-4C is:

```
//The algorithm builds the superimposed tree of diskchains in the duration
t1-t2.
Tree buildTree(t1,t2)
        diskchains = getDiskChainsBetween (t1,t2)
        Tree tree;
        for each diskchain in diskchains:
                for each disk in diskchain:
                        tree.addNode(disk)
                        if (disk.parent != null)
                                tree.addEdge(disk,disk.parent);
        return tree
```

As will be appreciated, the times (e.g., t1, t2) can be adjusted to provide a linked clone hierarchy over different time periods.

Figure 5:
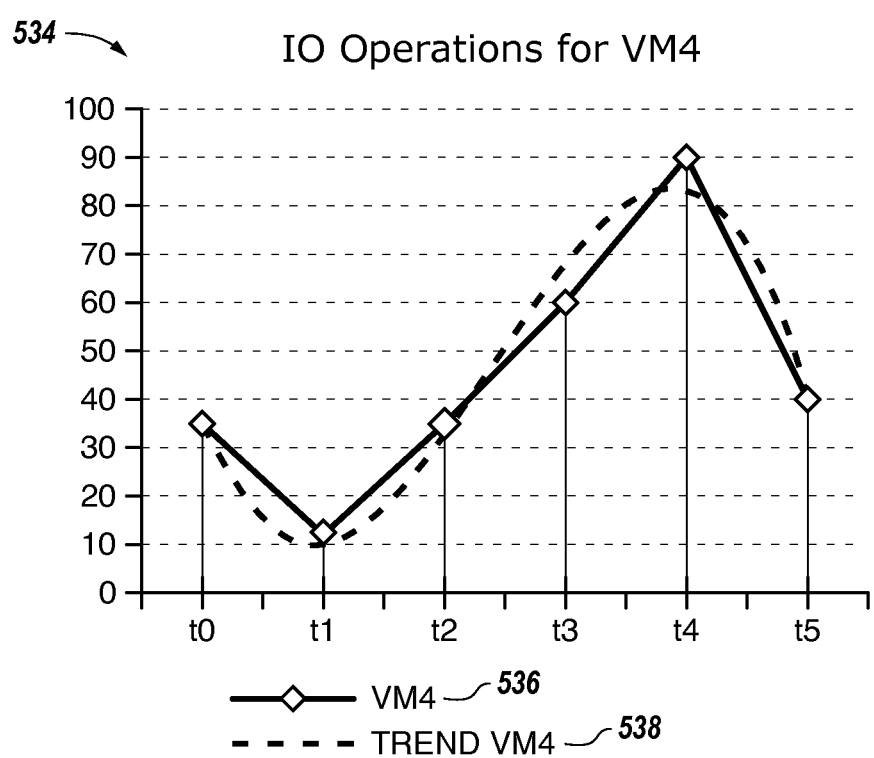
FIG. 5 is a graph of input/output operations for a linked clone virtual machine over time according to one or more embodiments of the present disclosure.

FIG. 5 is a graph 534 of input/output operations for a linked clone virtual machine over time according to one or more embodiments of the present disclosure. In some embodiments, costs of disk usage can be allocated to linked clone VMs based on dynamic parameters such as a proportion of IOPs for a given disk that are attributable to the linked clone VM. For example, the IOPs can be specific to read IOPs (e.g., where the disk is read only). If a VM were to overwrite blocks from a parent disk, it would reduce the dependency from the parent disk and hence the proportionate cost of using the disk by the VM would be lower.

Allocating costs based on IOPs can be a good metric because it can allocate more cost to a VM that is using a disk more than another VM. As described herein, runtime details about the IOPs can be provided by a hypervisor for the VM (e.g., hypervisor 104 illustrated in FIG. 1).

The graph 534 provides an example of usage of a disk (in terms of IOPs) for VM4 as indicated by the solid line at 536 and a trend of the usage by VM4 as indicated by the dashed line at 538. The usage is illustrated over time (from t0-t5). Examples of the specific data indicating usage in terms of IOPs for VM4, as well as VM1 and VM5 for comparison purposes is illustrated in FIG. 6A.

Figures 6A, 6B:
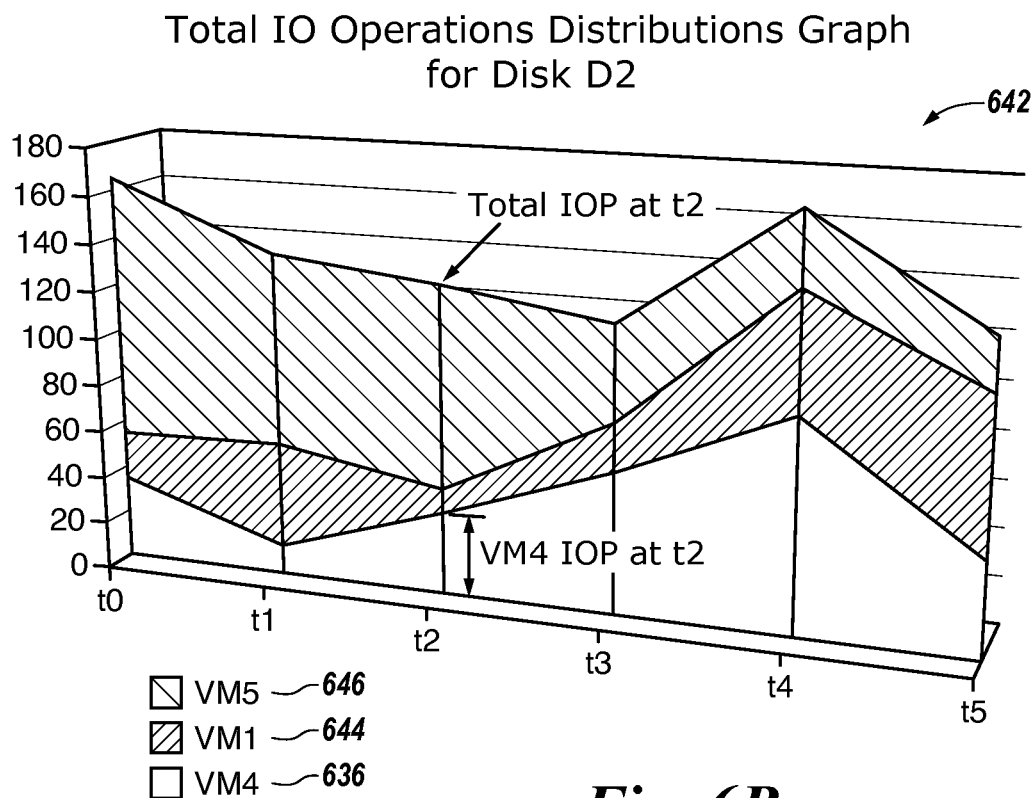
FIG. 6A is a chart illustrating a number of input/output operations for a particular disk by a number of linked clone virtual machines over time according to one or more embodiments of the present disclosure.
FIG. 6B a graph illustrating a distribution of input/output operations for the particular disk referenced in FIG. 6A by the number of linked clone virtual machines over time according to one or more embodiments of the present disclosure.

FIG. 6A is a chart 640 illustrating a number of input/output operations for a particular disk by a number of linked clone virtual machines over time according to one or more embodiments of the present disclosure. The time periods (t0, t1, t2, t3, t4, t5) correspond to the time periods illustrated in the graph 534 in FIG. 5. The numbers for each VM (VM4, VM1, VMS) represent a number of IOPs on the disk by the respective VM during the corresponding time period. For example, VM4 had 35 IOPs during time period t0 while VM1 had 20 and VMS had 110. This data is graphed for the VMs as illustrated in FIG. 6B.

FIG. 6B a graph 642 illustrating a distribution of input/output operations for the particular disk referenced in FIG. 6A by the number of linked clone virtual machines over time according to one or more embodiments of the present disclosure. The graph 642 includes the data from the chart 640 in FIG. 6A for VMS as illustrated with the "right-hash" data at 646, for VM1 as illustrated with the "left-hash" data at 644, and for VM4 as illustrated by the "blank" data at 636. The graph 642 helps to illustrate how much of the usage of the disk at any given time is attributable to each of the VMs using the disk (e.g., disk D2). At the early portion of the graph 642, most of the usage is attributable to VMS. However, at the later portions of the graph, most of the usage is attributable to VM4. The top of the graph (the top line above the usage for VMS) indicates the total usage for all of the VMs collectively. The usage for any one VM at any point on the graph is indicated by the difference between the top and bottom lines for that VM. For example, for VMS at time t1, the usage for VMS is (140-60), which equals 80, which matches the data for VMS at time t1 in the chart 640.

According to a number of embodiments of the present disclosure, a portion of a cost for usage of the disk over a time period can be allocated in proportion to the respective portion of the parameter of usage attributable to the linked clone VM, for example, as opposed to allocating the total cost to each of the VMs. As an example, assume that a cost for usage of the disk according to the parameter of usage (e.g., IOPs) is 1. For time period t2, the total IOPs are 130, as illustrated (and as indicated in the chart 640 by the sum of 35+10+85). Thus, the total cost of the disk for time period t2 is 130. An approach that allocated a total cost to each VM using the disk, would allocate the full 130 to each of VMS, VM1, and VM4. However, according to some embodiments of the present disclosure, the cost can be allocated in proportion to the usage by each VM, (e.g., VM4 can have a cost of 35, VM1 can have a cost of 10, and VMS can have a cost of 85 allocated thereto). As is also illustrated by the graph 642, the total usage and/or cost of a disk can vary with time. For example, the total usage of the disk changes from 130 over time period t2 to 120 over time period t3.

In order to allocate costs, according to the present disclosure, a total parameter of usage (e.g., IOPs) can be calculated for a time period for the VMs that use a disk. The cost can be allocated as a ratio of the parameter of usage for a particular VM to the total parameter of usage of the disk. For example, the cost for a VM can be calculated according to:

$$Cost_{VM_k} = \int_{t=t1}^{t2} \left( \sum_{\substack{i \in nodes \\ in\ the\ Path(root, VM_k)}} sizeof(D_i, t) * \frac{IOP_{VM_k}(D_i, t)}{\sum_{j=1}^{n} IOP_{VM_j}(D_i, t)} * u(t) \right) dt$$

where size of $(D_i, t)$ is the actual utilization of the disk at time t, $IOP_{VM_k}(D_i, t)$ is the number of IOPs for $VM_k$ on disk $D_i$ at time t, and $u(t)$ is the unit rate per unit time (e.g., per gigabyte (GB)-hour) at time t. In some embodiments, the unit rate per unit time can be common to all of the disks. In some embodiments, the unit rate per unit time can vary (can be specific to particular disks).

Figure 7:
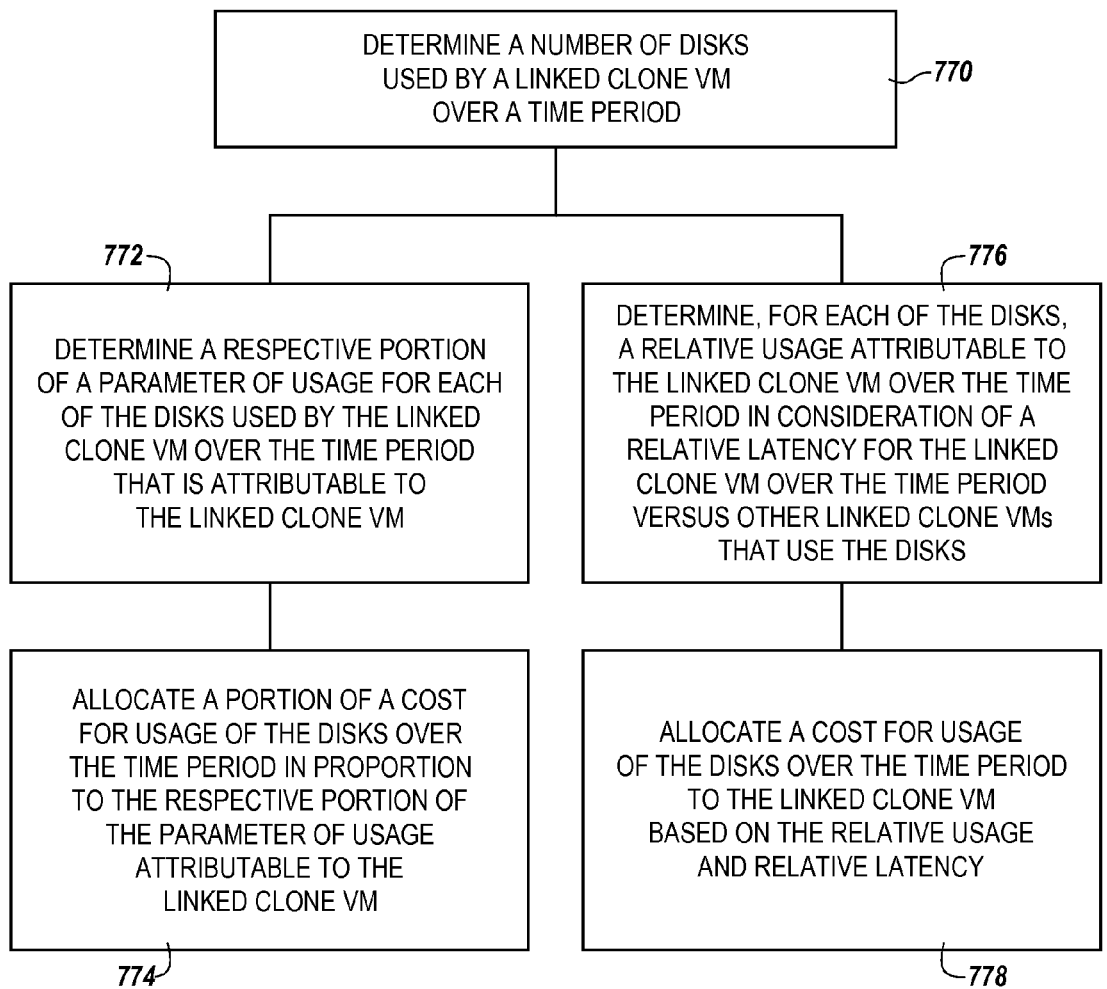
FIG. 7 is a flow chart illustrating an example of one or more methods for allocating costs to linked clone virtual machines according to one or more embodiments of the present disclosure.

FIG. 7 is a flow chart illustrating an example of one or more methods for allocating costs to linked clone virtual machines according to one or more embodiments of the present disclosure. In some embodiments, the flow chart can represent one method that has optional flows, for example, as illustrated from element 770 to element 772 or element 776. In some embodiments, the flow chart can represent two distinct methods: one that includes element 770, element 772, and element 774, and one that includes element 770, element 776, and element 778.

At 770 a method can include determining a number of disks used by a linked clone VM over a time period. From this point a number of options are available. For example, at 772, a method can include determining a respective portion of a parameter of usage for each of the disks used by the linked clone VM over the time period that is attributable to the linked clone VM. Then, at 774, a method can include allocating a portion of a cost for usage of the disks over the time period in proportion to the respective portion of the parameter of usage attributable to the linked clone VM.

In contrast, at 776, a method can include determining, for each of the disks, a relative usage attributable to the linked clone VM over the time period in consideration of a relative latency for the linked clone VM over the time period versus other linked clone VMs that use the disks. Then, at 778, a method can include allocating a cost for usage of the disks over the time period to the linked clone VM based on the relative usage and the relative latency.

In some embodiments, a method for allocating costs to linked clone VMs can include determining a number of disks, among a plurality of disks in a software defined data center, from which snapshots were taken to form a linked clone virtual machine (VM). In some embodiments, determining the number of disks includes adding a delta disk for the linked clone VM to the number of disks. A method can include determining a respective portion of a plurality of IOPs for the number of disks over a time period that are attributable to the linked clone VM. A method can include allocating, to the linked clone VM, a portion of a cost for usage of each of the number of disks over the time period in proportion to the respective portion of the plurality of IOPs attributable to the linked clone VM. In some embodiments, a method can include determining the respective portion of the plurality of IOPs over the time period in consideration of a relative latency for the linked clone VM over the time period versus other linked clone VMs that use the number of disks and allocating the portion of the cost in proportion to the plurality of IOPs attributable to the linked clone VM in consideration of the relative latency for the linked clone VM.

In some embodiments, a proportionate cost of usage of a disk can be allocated to a linked clone VM based on a parameter of usage (e.g., IOPs) on the disk in consideration of the relative latency of the parameter of usage for the linked clone VM. Consider, for example, two linked clone VMs that make the same number of IOPs on a disk over a time period. If the latency of the IOPs is different for the different VMs, then the different VMs are not receiving the same quality of service. Examples of cause for such a difference can include different storage I/O control parameters (e.g., different tiers of service), different network latencies, etc. In some embodiments, a greater cost of usage can be allocated for a lower latency for a same parameter of usage between two different VMs over a same time period. For example, the cost for a VM can be calculated according to:

$$Cost_{VM_k} = \int_{t=t1}^{t2} \left( \frac{\sum_{i \in nodes, in\ the\ Path(root, VM_k)} sizeof(D_i, t) * IOP_{VM_k}(D_i, t) * LF'_{VM_k}(t)}{\sum_{j=1}^{n} IOP_{VM_j}(D_i, t) * LF'_{VM_j}(t)} * u(t) \right) dt$$

where $L_{VM_k}(t)$ is the latency of $VM_k$ at time t, $L'_{VM_k}(t)$ is the inverse of the latency (e.g., so that higher latency results in a lesser cost allocation and lower latency results in an greater cost allocation) such that $$L'_{VM_k}(t) = \frac{1}{L_{VM_k}(t)},$$

and where $LF'_{VM_k}(t)$ is that latency factor for $VM_k$ such that:

$$LF'_{VM_k}(t) = AVG_{L'}(t) + \omega * (L'_{VM_k}(t) - AVG_{L'}(t))$$

where $AVG_{L'}$ is the arithmetic mean/average for all VMs inverse latencies for disk $D_i$ at time t, $(L'_{VM_k}(t) - AVG_{L'}(t))$ is the deviation of the inverse latency from the average inverse latency, and ω is the weight of the latency effect on the cost. The weight can be a user defined and/or system defined value that can be received as an input. The deviation can be multiplied by the weight to help control the effect of the latency. If ω=0 then $LF'_{VM_k}(t) = AVG_{L'}(t)$, which would nullify the effect of latency on the cost allocation.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A system, comprising:
processing and memory resources or hardware logic configured to implement:
a disk usage engine configured to:
determine, for a linked clone virtual machine (VM) that is a copy of a parent VM and shares at least one disk with the parent VM, a number of disks used by the linked clone VM among a plurality of disks in a software defined data center over a time period;
determine a respective portion of a parameter of usage for each of the number of disks used by the linked clone VM over the time period that is attributable to the linked clone VM;
build a linked clone tree for a number of VMs that use the plurality of disks during the time period, wherein each node in the tree represents one of the plurality of disks, and
for a leaf in the tree corresponding to the linked clone VM, determine a path from a root of the tree, wherein the path includes a number of nodes representing the number of disks used by the linked clone VM; and a cost engine configured to allocate, to the linked clone VM, a portion of a cost for usage of each of the number of disks over the time period in proportion to the respective portion of the parameter of usage attributable to the linked clone VM.

2. The system of claim 1, wherein the disk usage engine is configured to poll a hypervisor of the linked clone VM to determine the portion of the parameter of usage, comprising a plurality of input/output operations (IOPs), that is attributable to the linked clone VM.

3. The system of claim 2, wherein the disk usage engine is configured to determine, for each of the plurality of disks, a respective total plurality of IOPs over the time period.

4. The system of claim 3, wherein the plurality of IOPs comprise read IOPs for the plurality of disks.

5. The system of claim 1, wherein the cost engine is configured to allocate the portion of the cost based on a unit rate per unit time.

6. The system of claim 5, wherein the unit rate per unit time is generic to the number of disks.

7. The system of claim 5, wherein the unit rate per unit time is specific for each of the number of disks.

8. The system of claim 1, wherein the cost engine is configured to allocate, to the linked clone VM, the portion of the cost regardless of relative latency of the linked clone VM to latency of other linked clone VMs that use the number of disks.

9. A non-transitory machine-readable medium storing instructions executable by a processing resource to cause a computing system to:
   determine, for each of a number of disks used by a linked clone virtual machine (VM) that is a copy of a parent VM and shares at least one disk with the parent VM, among a plurality of disks in a software defined data center, a relative usage attributable to the linked clone VM over a time period in consideration of a relative latency for the linked clone VM over the time period versus other linked clone VMs that use the number of disks;
   wherein the instructions to determine the relative usage and the relative latency comprise instructions to determine:
      a first value comprising a number of input/output operations (IOPs) attributable to the linked clone VM over a time period in consideration of a latency factor for the linked clone VM over the time period; and
      a second value comprising a sum of a number of IOPs attributable to each other linked clone VM that uses the number of disks over the time period in consideration of a latency factor for each other linked clone VM; and
   allocate, to the linked clone VM, a cost for usage of each of the number of disks over the time period based on the relative usage and relative latency.

10. The medium of claim 9, wherein the instructions to allocate the cost comprise instructions to allocate, to the linked clone VM, the cost for usage of each of the number of disks over the time period in proportion to a ratio of the first value to the second value.

11. The medium of claim 9, wherein the instructions to determine the relative usage in consideration of the relative latency comprise instructions to determine a latency factor for the linked clone VM.

12. The medium of claim 11, including instructions to determine the latency factor based on:
   a latency for the linked clone VM;
   an average latency for the linked clone VM and the other linked clone VMs; and
   a weight of latency on cost.

13. The medium of claim 12, including instructions to:
   measure the latency for the linked clone VM during runtime;
   measure the average latency for the linked clone VM and the other linked clone VMs during runtime; and
   receive the weight of latency on cost as an input.

14. The medium of claim 9, including instructions to determine the number of disks used by the linked clone VM over the time period.

15. The medium of claim 14, wherein the instructions to determine the number of disks used by the linked clone VM comprise instructions to determine a path from a root of a linked clone tree for the linked clone VM,
   wherein the linked clone tree represents a plurality of linked clone VMs that use the plurality of disks during the time period,
   wherein each node in the tree represents one of the plurality of disks, and
   wherein the path includes a number of nodes representing the number of disks used by the linked clone VM.

16. A method, comprising:
   determining a number of disks, among a plurality of disks in a software defined data center, from which snapshots were taken to form a linked clone virtual machine (VM) that is a copy of a parent VM and shares at least one disk with the parent VM;
   determining a respective portion of a plurality of input/output operations (IOPs) for the number of disks over a time period that are attributable to the linked clone VM in consideration of a relative latency for the linked clone VM over the time period versus other linked clone VMs that use the number of disks; and
   allocating, to the linked clone VM, a portion of a cost for usage of each of the number of disks over the time period in proportion to the respective portion of the plurality of IOPs attributable to the linked clone VM in consideration of the relative latency for the linked clone VM.

17. The method of claim 16, wherein determining the number of disks includes adding a delta disk for the linked clone VM to the number of disks.

18. A non-transitory machine-readable medium storing instructions executable by a processing resource to cause a computing system to:
   determine, for each of a number of disks used by a linked clone virtual machine (VM) that is a copy of a parent VM and shares at least one disk with the parent VM, among a plurality of disks in a software defined data center, a relative usage attributable to the linked clone VM over a time period in consideration of a relative latency for the linked clone VM over the time period versus other linked clone VMs that use the number of disks;
   wherein the instructions to determine the relative usage in consideration of the relative latency comprise instructions to determine a latency factor for the linked clone VM based on:
      a latency for the linked clone VM;
      an average latency for the linked clone VM and the other linked clone VMs; and
      a weight of latency on cost;

measure the latency for the linked clone VM during runtime;

measure the average latency for the linked clone VM and the other linked clone VMs during runtime;

receive the weight of latency on cost as an input; and allocate, to the linked clone VM, a cost for usage of each of the number of disks over the time period based on the relative usage and relative latency.

19. A non-transitory machine-readable medium storing instructions executable by a processing resource to cause a computing system to:

determine, for each of a number of disks used by a linked clone virtual machine (VM) that is a copy of a parent VM and shares at least one disk with the parent VM, among a plurality of disks in a software defined data center, a relative usage attributable to the linked clone VM over a time period in consideration of a relative latency for the linked clone VM over the time period versus other linked clone VMs that use the number of disks;

determine the number of disks used by the linked clone VM over the time period by determining a path from a root of a linked clone tree for the linked clone VM, wherein the linked clone tree represents a plurality of linked clone VMs that use the plurality of disks during the time period, wherein each node in the tree represents one of the plurality of disks, and wherein the path includes a number of nodes representing the number of disks used by the linked clone VM; and allocate, to the linked clone VM, a cost for usage of each of the number of disks over the time period based on the relative usage and relative latency.

\* \* \* \* \*